Patented Feb. 27, 1951  2,543,260

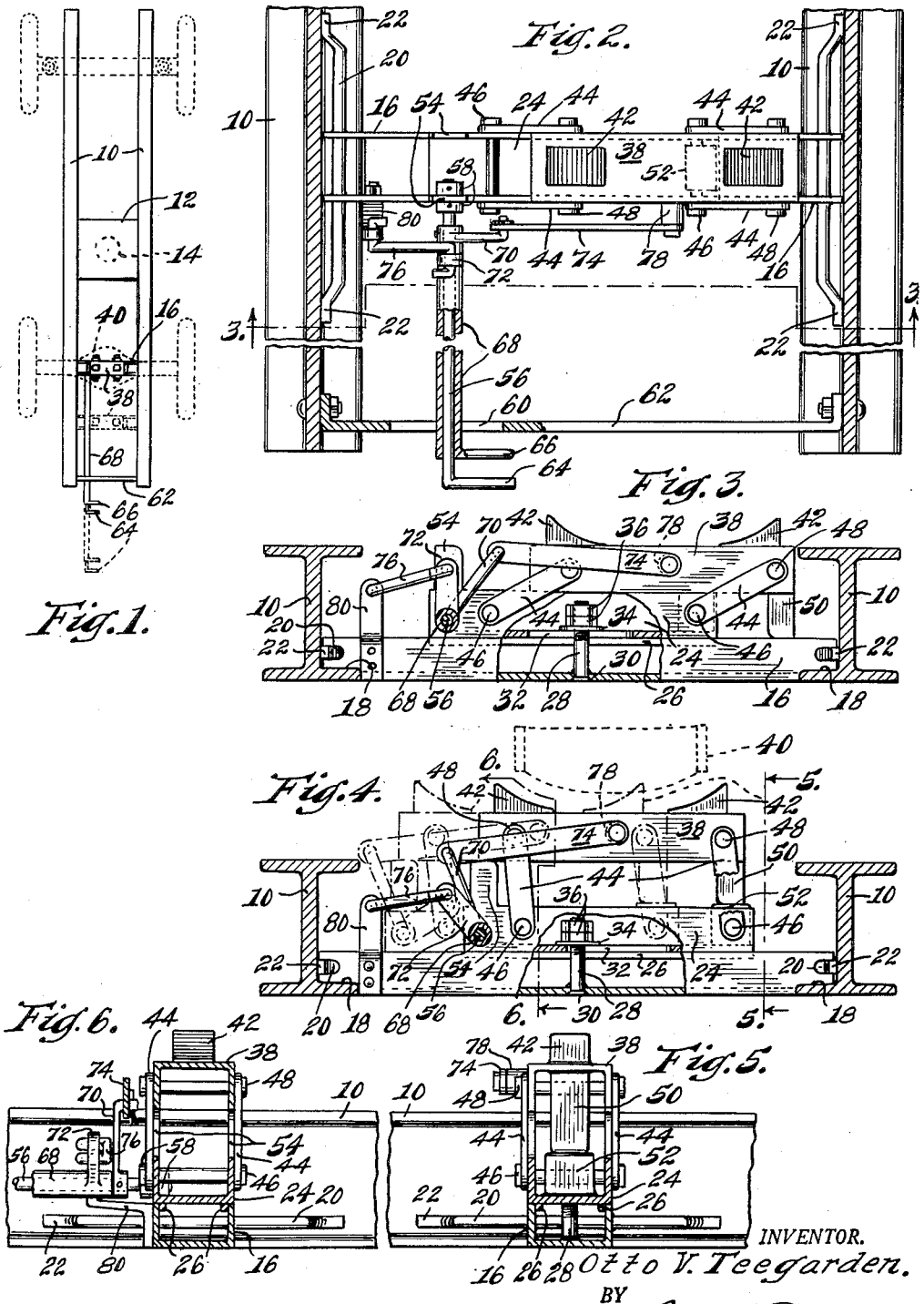

UNITED STATES PATENT OFFICE 2,543,260

DIFFERENTIAL SUPPORT FOR HOISTS

Otto V. Teegarden, Goshen, Ind., assignor to Verne Stephenson, Goshen, Ind.

Application November 29, 1946, Serial No. 713,168

5 Claims. (Cl. 254—89)

My present invention relates to a support for engaging the differential of an automobile after it is driven on a hoist and the hoist is thereafter elevated.

One object of the invention is to provide a support mounted on a "drive-on" hoist in such manner that it may be adjusted longitudinally of the rails thereof from a convenient point at the end of the hoist and can also be adjusted laterally of the rails to register with the differential of the automobile when not exactly centered laterally thereover.

Another object is to provide means for adjusting the support from a lowered to an elevated position in relation to the rails of the hoist so that the automobile can be freely driven over the rails and the support then may be raised relative to the rails so that it keeps the automobile level when the hoist is subsequently elevated to in turn elevate the automobile.

More particularly it is my object to provide a differential support which is slidable longitudinally of the rails and has a support mounted by means of links on a laterally slidable carriage, the links permitting either a lowered or raised position of the support, and a control element extending from the support to a position beyond one end of the hoist rails where it is conveniently accessible for accomplishing all three adjustments of the support to wit:

(1) Sliding of the support longitudinally of the rails, (2) Raising and lowering of the supporting element relative to the rails and (3) Lateral shifting of the supporting element relative to the rails.

A further object is to provide a differential support which is readily adjustable with a minimum of effort and which is inexpensive to manufacture and easy to operate from the standpoint of convenience of a service station attendant in handling an automobile on a hoist.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a hoist with my differential support mounted thereon, the position of the automobile wheels and axles in relation thereto being shown by dotted lines.

Figure 2 is an enlarged plan view of the support with the upper flanges of the I beam rails of the hoist broken away and the vertical webs thereof shown in section.

Figure 3 is a sectional view on the line 3—3 of Figure 2.

Figure 4 is a similar sectional view showing the parts in a different position, and Figures 5 and 6 are sectional views on the lines 5—5 and 6—6, respectively, of Figure 4.

On the accompanying drawings I have used the reference numeral 10 to indicate the rails of a drive-on hoist. These are ordinarily connected together by a center member 12 secured to a plunger 14 extending downwardly into a cylinder imbedded in the floor of a garage or service station. Compressed air or oil is supplied to the cylinder for causing the hoist to elevate an automobile or other load.

My differential support comprises a channel shaped cross bar 16, the web of which is cut away at the ends to provide notches 18 to fit the lower flanges of the I beams or rails 10. The cross bar 16 merely rests on these flanges and is thereby slidable longitudinally of the rails.

To prevent the cross bar 16 from twisting out of alignment and bending, I provide guide rods 20 welded through the flanges of the bar 16 and having offset ends 22 serving as slide shoes along the vertical webs of the I beams 10.

Slidable longitudinally of the bar 16 is a carriage 24 which is also a channel and to guide it in its sliding movement square bars or rods 26 (see Figure 6) are welded to the web of this channel. To limit the sliding movement of the carriage 24 relative to the cross bar 16, I provide a bolt 28 through a perforation 30 in the bar 16 and through a slot 32 in the carriage 24 (see Figure 3). The bolt has a washer 34 thereon and a pair of lock nuts 36 which are adjusted to a point where they permit sliding but prevent binding and prevent the carriage 24 from moving upwardly to a point where the guide rods 26 would be out of position between the flanges of the cross bar 16.

A supporting element 38 in the form of an inverted channel is provided to engage the differential housing 40 of an automobile. A pair of positioning blocks 42 are welded to the upper surface of the web of the channel 38 to prevent lateral movement of the differential housing when supported on the supporting element 38.

The supporting element 38 is in turn supported on the carriage 24 by means of two pairs of links 44 pivoted to the carriage and the supporting element by means of pivot pins 46 and 48. These links are adapted to assume the position shown in Figure 3 with the supporting element 38 lowered so that its flanges rest on the flanges of the cross bar 16, or a raised position shown in Figure 4 with a stop block 50 welded to the web of the channel 38 resting on a stop block 52 welded to the web of the channel 16. Thus the right hand end of the supporting element in Figure 4 is supported. The left hand end is supported by reason of its flanges resting on stop straps 54 welded to the flanges of the carriage 24 and extending upwardly.

In the upper position just described the links 44 are slightly past vertical dead center so that any weight on the supporting element 38 tends to swing them counter-clockwise and thus prevent accidental return of the supporting element to the position of Figure 3 while a weight is imposed on the supporting element. To prevent interference of the stops 50, 52 and 54 and the flanges of the element 38 with each other, their corners are rounded as best shown in Figure 4.

For controlling the differential support, I provide a rod 56 oscillatably mounted in the lower flange of the carriage 24 (see Figure 2) and held against endwise movement by a pair of collars 58. The rod extends through a slot 60 and a bar 62, and terminates in a handle 64. A second handle 66 is provided adjacent the handle 64 and the latter handle is secured to a tube 68 oscillatable mounted on the rod 56.

The rod 56 has an actuating arm 70 and the tube 68 has an actuating arm 62. These are respectively connected by links 74 and 76 to a stud 78 extending from the supporting element 38 and to a bracket 80 extending from the cross bar 16.

Practical operation

In the operation of my differential support, after the automobile is driven over the hoist (the hoist being lowered to a position contacting with the floor) the differential support may be adjusted as from the dotted position of Figure 1 to the solid line position for registering the support in one direction with the differential housing 40. While the automobile is being driven on the hoist the supporting element 38 of course would be in the lowered position of Figure 3.

After longitudinally positioning the support, the next step is to raise the supporting element 38 from the position of Figure 3 to the position of Figure 4. This is accomplished by turning the handle 64 counter-clockwise so that the link 74 causes the element 38 to move up and to the left and the links 44 to rotate counter-clockwise.

It may now be found that the positioning blocks 42 are not centered in relation to the housing 40. Accordingly the handle 66 may be rotated, for instance, counter-clockwise from the position of Figure 3 to shift the carriage 24 to the right as shown in Figure 4 so that the supporting element 38 is centrally located with respect to the housing 40. Figure 3 shows a central position for the carriage 24 and Figure 4 shows by means of dot and dash lines the extreme left-hand position thereof, the solid lines in Figure 4 of course showing the extreme right-hand position.

After the differential support is properly located in respect to the differential housing 40 the hoist may be operated for elevating the automobile for greasing or other work to be performed thereon. After the hoist is lowered the differential supporting element 38 is returned to the position of Figure 3 by rotating the handle 64 clockwise and the automobile can be driven off the hoist.

The handles 64 and 66 located as they are on the extended rod 56 and tube 68 serve to impart all three adjustments to the differential support at a position of the operator beyond the end of the lift and the automobile. The slot 60 permits the required movement of the tube and rod laterally with the carriage 24 as it is shifted.

The device is convenient to operate and convenient to adjust as required after the automobile is positioned over the hoist. It is not always possible to accurately center the vehicle with respect to the hoist when driving over it and the longitudinal and lateral adjustments of the differential support therefore compensate for any misalignment and at the same time engage the differential housing for proper balance of the automobile as it is being elevated.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an accessory of the character disclosed, a first carriage movable longitudinally of a hoist, a second carriage movable on said first carriage laterally of said hoist, a supporting element, pivoted link connection between said second carriage and said supporting element, and means for operating said carriages and supporting element comprising a rod extending from said second carriage and having an arm, a link connected with said arm and with said supporting element, a tube surrounding said rod and having an arm, a second link connected with said last arm and with said first carriage, said hoist having a slotted cross bar at one end thereof through which said rod and tube extend, and handles mounted on the rod and tube for oscillating them and thereby their arms.

2. In an accessory of the character disclosed, a carriage movable longitudinally of a hoist, a supporting element, a pivoted arm and link connection between said carriage and said supporting element, and means for operating said carriage and said supporting element comprising a rod extending from said arm and journalled in said carriage, and a handle mounted on said rod for oscillating it, said rod serving as a means to slide said carriage longitudinally of said rails.

3. In an accessory of the character disclosed, a first carriage movable longitudinally of a hoist, a second carriage movable on said first carriage laterally of said hoist, a supporting element, pivoted link connection between said second carriage and said supporting element, and means for operating said carriages and supporting element comprising a rod extending from said second carriage and having an arm, a link connected with said arm and with said supporting element, a tube surrounding said rod and having an arm, a second link connected with said last arm and with said first carriage, and handles mounted on the rod and tube for oscillating them, said handles serving also as a means to effect such longitudinal movement of said first carriage.

4. In an accessory of the character disclosed, a first carriage movable longitudinally of an elongated hoist, a second carriage movable laterally of said first carriage, a supporting element on said second carriage, an extension handle for accomplishing both of said movements, said extension handle comprising a rod extending from an operating position beyond the end of the hoist to said second carriage and connected therewith to push and pull both carriages along the hoist, and a tube oscillatable on said rod and provided with an arm linked to said first carriage for sliding said second carriage relative to said first carriage when said tube is oscillated.

5. In an accessory of the character disclosed, a first carriage movable longitudinally of an elongated hoist, a pair of carriages, one movable longitudinally of the hoist and the other movable laterally thereof and carried by the first carriage, a supporting element on said second carriage, said supporting element being variable in elevation with respect to said second carriage, a telescoping rod and tube operating member rotatably and non-slidably connected with one of said carriages, and arm and link connections from said rod and said tube to the other of said carriages and to said supporting element for moving said second carriage along said first carriage and thereby laterally of said hoist and for changing the elevation of said supporting element respectively, said operating member having manually engageable portions extending beyond the end of the hoist.

OTTO V. TEEGARDEN.

REFERENCES CITED

The following references are of record in the file of this patent:

UNITED STATES PATENTS

| Number | Name | Date |
|---|---|---|
| 2,120,150 | Tully | June 7, 1938 |
| 2,124,314 | Robison et al. | July 19, 1938 |

FOREIGN PATENTS

| Number | Country | Date |
|---|---|---|
| 516,650 | Germany | Jan. 26, 1931 |